United States Patent
Yamamoto et al.

(10) Patent No.: US 9,806,359 B2
(45) Date of Patent: Oct. 31, 2017

(54) FUEL CELL SYSTEM AND CONTROL METHOD THEREFOR

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/937,707

(22) Filed: Nov. 10, 2015

(65) Prior Publication Data
US 2016/0141660 A1    May 19, 2016

(30) Foreign Application Priority Data
Nov. 14, 2014  (JP) ................... 2014-231194

(51) Int. Cl.
  *H01M 8/04* (2016.01)
  *H01M 8/04119* (2016.01)
  *H01M 8/04746* (2016.01)
  *H01M 8/04089* (2016.01)
  *H01M 8/04492* (2016.01)

(52) U.S. Cl.
  CPC ... *H01M 8/04179* (2013.01); *H01M 8/04097* (2013.01); *H01M 8/04514* (2013.01); *H01M 8/04761* (2013.01)

(58) Field of Classification Search
  CPC ......... H01M 8/04179; H01M 8/04514; H01M 8/04097; H01M 8/04761
  See application file for complete search history.

(56) References Cited

U.S. PATENT DOCUMENTS

| | | | |
|---|---|---|---|
| 2007/0259243 | A1 | 11/2007 | Jufuku et al. |
| 2009/0250371 | A1 | 10/2009 | Katano |
| 2011/0212371 | A1 | 9/2011 | Itoga |
| 2013/0157161 | A1 | 6/2013 | Matsusue |

(Continued)

FOREIGN PATENT DOCUMENTS

| | | |
|---|---|---|
| JP | 2007-115460 | 5/2007 |
| JP | 2000-171770 | 7/2008 |
| JP | 2009-151999 A | 7/2009 |

(Continued)

*Primary Examiner* — Stewart Fraser
(74) *Attorney, Agent, or Firm* — Finnegan, Henderson, Farabow, Garrett & Dunner, LLP (57) ABSTRACT

A fuel cell system includes: a fuel cell; an anode gas supply flow path for supplying an anode gas to the fuel cell; an anode gas discharge flow path for discharging an anode off gas from the fuel cell; an anode gas circulation flow path for connecting the anode gas supply flow path and the anode gas discharge flow path to each other; a circulation device provided on the anode gas circulation flow path and serving for supplying the anode off gas to the anode gas supply flow path; and a controller. When liquid water is residing in the circulation device, the controller controls a circulation flow rate of the circulation device to discharge the liquid water residing in the circulation device. The controller restricts an increasing rate of the circulation flow rate of the circulation device if it is decided that a quantity of the liquid water residing in the circulation device is equal to or more than a specified value.

8 Claims, 8 Drawing Sheets

(56) References Cited

U.S. PATENT DOCUMENTS

2015/0125767 A1\* 5/2015 Wake ................ H01M 8/04291
429/414
2016/0141656 A1\* 5/2016 Yamamoto ........ H01M 8/04835
429/414

FOREIGN PATENT DOCUMENTS

| JP | 2010-003412 A | 1/2010 |
| JP | 2010-135194 A | 6/2010 |
| JP | 2011-181341 A | 9/2011 |

\* cited by examiner

FUEL CELL SYSTEM AND CONTROL METHOD THEREFOR

CROSS REFERENCE TO RELATED APPLICATIONS

This application claims priority to Japanese Patent Application No. 2014-231194 filed on Nov. 14, 2014, the entire contents of which are incorporated by reference herein.

BACKGROUND

Field

The present invention relates to a fuel cell system and a control method therefor.

Related Art

Regarding a fuel gas supply system for supplying a fuel gas (hydrogen) to an anode of a fuel cell (fuel cell stack), there has conventionally been developed a fuel cell system in which fuel gas that has not been consumed by the anode of the fuel cell is circulated to the fuel gas supply system via a circulation pump of a fuel gas circulation system. As an example of this fuel cell system having a fuel gas circulation system, it is disclosed in JP2007-115460A that liquid water condensed on a pipe inner wall of a fuel gas circulation system is discharged by increasing the rotation speed of the circulation pump so as to reduce the possibility that excess liquid water may flow into the circulation pump. Also, it is disclosed in JP2008-171770A that the sounds accompanying the drive of a circulation pump (hydrogen pump) are masked with the sounds accompanying the drive of a compressor or a motor that serves as a load for a fuel cell.

However, in cases where a low-load operation of the fuel cell system is continued for a long time such as where a low-load power generation is continued for a long time, a low-rotation operation of the circulation pump, when continued for a long time, may cause liquid water to reside inside the fuel cell or at particular sites in a fuel gas circulation system, particularly from an outlet of a gas-liquid separator to a suction port of the circulation pump. For example, there are cases where liquid water resides as a result of condensation due to temperature differences between the fuel cell and the circulation pump or liquid water sucked from within the gas-liquid separator by the circulation pump. With this residing water over a specified quantity, there may occur biting of the residing water in the circulation pump during high rotation of the circulation pump. This may lead to generation of abnormal noise or high volume of sounds accompanying the drive of the circulation pump (hereinafter, also referred to as 'abnormal noise or the like'), thereby problematically giving the user a sense of discomfort or a sense of incompatibility, anxiety for faults and the like.

SUMMARY

The present invention has been accomplished with a view to solving at least part of the above-described problems and can be realized in aspects described below.

(1) According to a first aspect, there is provided a fuel cell system. The fuel cell system includes: a fuel cell; an anode gas supply flow path for supplying an anode gas to the fuel cell; an anode gas discharge flow path for discharging an anode off gas from the fuel cell; an anode gas circulation flow path for connecting the anode gas supply flow path and the anode gas discharge flow path to each other; a circulation device provided on the anode gas circulation flow path and serving for supplying the anode off gas to the anode gas supply flow path; and a controller. When liquid water is residing in the circulation device, the controller controls a circulation flow rate of the circulation device to discharge the liquid water residing in the circulation device. The controller restricts an increasing rate of the circulation flow rate of the circulation device if it is decided that a quantity of the liquid water residing in the circulation device is equal to or more than a specified value.

According to a fuel cell system of this aspect, a circulation flow rate of a circulation device will be increased slowly, so that the liquid water residing in an anode gas circulation flow path will be blocked from being sucked inward of the circulation device; even though the liquid water residing in the anode gas circulation flow path is sucked inward of the circulation device, it is possible to suppress the generation of abnormal noise or the like as working noise of the circulation device.

(2) In the fuel cell system, the controller may determine whether the liquid water residing in the circulation device is equal to or more than the specified value by estimating a quantity of the liquid water residing in the circulation device based on a relationship between a water-dischargeable quantity at a water-dischargeable circulation flow rate at which the liquid water is dischargeable from the circulation device and a quantity of the liquid water residing in the circulation device at a water-undischargeable circulation flow rate at which the liquid water is undischargeable from the circulation device.

According to a fuel cell system of this aspect, the liquid water residing in a circulation device will be easily estimated, so that it can be easily decided whether the quantity of residing liquid water is equal to or more than a specified value.

(3) In the fuel cell system, when the controller increases the circulation flow rate to a specified quantity or more to discharge liquid water from the circulation device, the controller may undo the restriction of the increasing rate of the circulation flow rate by the circulation device.

According to a fuel cell system of this aspect, when the circulation flow rate is increased to a specified quantity or more, it is possible to quickly increase the circulation flow rate under the condition that, for example, a high amount of power generation quantity (output current quantity) is required for the fuel cell so that a quick increase in the circulation flow rate of anode-off gas is enabled and a quick increase in the circulation flow rate is desired.

(4) In the fuel cell system, the circulation device may be a circulation pump, and the controller may restrict the increasing rate of the circulation flow rate by restricting an increasing rate of rotating speed of the circulation pump corresponding to the circulation flow rate.

The present invention may be implemented in various ways, for example, in such a way as a fuel cell system or a control method for a fuel cell system.

DESCRIPTION OF THE EMBODIMENTS

A. Embodiments

Figure 1:
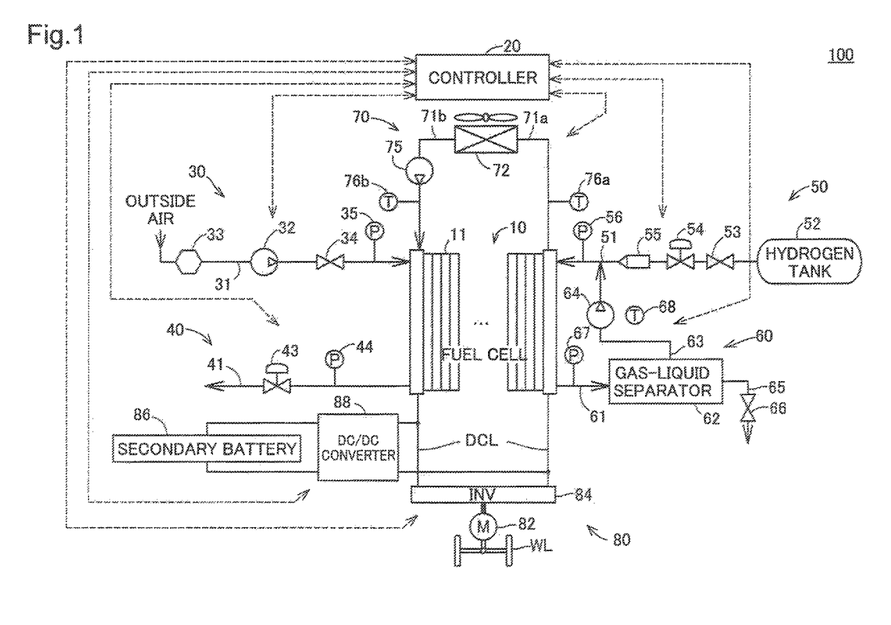
FIG. 1 is a schematic diagram showing a configuration of a fuel cell system as an embodiment of the invention.

FIG. 1 is a schematic diagram showing a configuration of a fuel cell system 100 as an embodiment of the invention. In this embodiment, the fuel cell system 100 is mounted on a vehicle (also referred to as 'fuel cell vehicle'). The fuel cell system 100 outputs electric power, which makes power source for the vehicle, in response to a request by an accelerator pedal (not shown) from a vehicle's driver (the request will be also referred to as 'accelerator position').

The fuel cell system 100 includes a fuel cell 10, a controller 20, a cathode gas supply system 30, a cathode gas discharge system 40, an anode gas supply system 50, an anode gas circulation system 60, a cooling medium circulation system 70, and a power charge/discharge system 80.

The fuel cell 10 is a polymer electrolyte fuel cell which generates electric power on receiving supply of hydrogen as a fuel gas (also referred to as 'anode gas') and air (oxygen, strictly) as an oxidizing gas (also referred to as 'cathode gas'). Hereinafter, the anode gas and the cathode gas will be also referred to as 'reactant gases,' collectively. The fuel cell 10 has a stack structure in which a plurality of unit cells 11 are stacked. In this embodiment, the fuel cell 10 is a so-called counter flow type fuel cell, in which anode gas and cathode gas flow oppositely in counter directions. Normally, the fuel cell 10 is so positioned that along surfaces of the individual unit cell 11, the anode gas flows down from the upside toward the downside while the cathode gas flows up from the downside toward the upside. In addition, in the fuel cell 10, manifolds for the reactant gases and the cooling medium are formed as through holes extending along the stacking direction, but the manifolds are omitted in the drawings.

Each unit cell 11, which is not shown, basically has a structure that an MEA (Membrane-Electrode Assembly) as a power generator is sandwiched between separators. The MEA is composed of a polymer electrolyte membrane (also referred to as electrolyte membrane, simply) formed of an ion exchange membrane, an anode made up of a catalyst layer and a gas diffusion layer formed on an anode-side surface of the electrolyte membrane, and a cathode made up of a catalyst layer and a gas diffusion layer formed on a cathode-side surface of the electrolyte membrane. Also, there are formed groove-like gas flow paths, which allow the anode gas and the cathode gas to pass through, on surfaces of the separators in contact with the gas diffusion layers. However, in some cases a gas flow path member is disposed between a separator and a gas diffusion layer.

The controller 20 is a control unit which controls the cathode gas supply system 30, the cathode gas discharge system 40, the anode gas supply system 50, the anode gas circulation system 60 and the cooling medium circulation system 70 so that the fuel cell 10 generates power in response to an output request from the external to the system. The controller 20 is, for example, a microcomputer including a CPU, ROM, and RAM, and it executes software programs corresponding to various types of control, thereby fulfilling functions as an overall controller, a cathode gas controller for controlling the cathode gas supply system 30 and the cathode gas discharge system 40, an anode gas controller for controlling the anode gas supply system 50 and the anode gas circulation system 60, and a cooling medium controller for controlling the cooling medium circulation system 70.

The cathode gas supply system 30 includes cathode gas supply piping 31, an air compressor 32, an air flow meter 33, an opening/closing valve 34, and a pressure measuring unit 35. The cathode gas supply piping 31 is connected to the cathode gas supply manifold of the fuel cell 10.

The air compressor 32 is connected to the fuel cell 10 via the cathode gas supply piping 31. The air compressor 32 takes in and compresses outside air to supply the compressed air as the cathode gas to the fuel cell 10. The air flow meter 33 measures a quantity of outside air to be taken in by the air compressor 32 on an upstream side of the air compressor 32, transmitting a measurement result to the controller 20. Based on the measured value, the controller 20 drives the air compressor 32 to thereby control the air supply quantity to the fuel cell 10.

The opening/closing valve 34 is provided between the air compressor 32 and the fuel cell 10. The opening/closing valve 34 is normally closed, and when air having a specified pressure is supplied from the air compressor 32 to the cathode gas supply piping 31, the opening/closing valve 34 is opened. The pressure measuring unit 35 measures a pressure of air supplied from the air compressor 32 at a position near an inlet of the cathode gas supply manifold of the fuel cell 10, and outputs a measurement result to the controller 20.

The cathode gas discharge system 40 includes cathode exhaust gas piping 41, a pressure regulating valve 43, and a pressure measuring unit 44. The cathode exhaust gas piping 41 is connected to the cathode gas discharge manifold of the fuel cell 10. The cathode exhaust gas (also referred to as 'cathode off gas') is discharged to outside of the fuel cell system 100 via the cathode exhaust gas piping 41.

The pressure regulating valve 43 is controlled in its degree of opening by the controller 20 to adjust the pressure of cathode exhaust gas at the cathode exhaust gas piping 41 (back pressure on the cathode side of the fuel cell 10). The pressure measuring unit 44, which is provided upstream of the pressure regulating valve 43, measures the pressure of the cathode exhaust gas and outputs a measurement result to the controller 20. Based on the measured value of the pressure measuring unit 44, the controller 20 adjusts the degree of opening of the pressure regulating valve 43 to thereby control the cathode-side back pressure of the fuel cell 10.

The anode gas supply system 50 includes anode gas supply piping 51, a hydrogen tank 52, an opening/closing valve 53, a regulator 54, a hydrogen supply unit 55, and a pressure measuring unit 56. The hydrogen tank 52 is connected to an inlet of the anode gas supply manifold (not shown) of the fuel cell 10 via the anode gas supply piping 51 and supplies hydrogen filled in the tank to the fuel cell 10. The anode gas supply piping 51 is also referred to as 'anode gas supply flow path.'

Provided on the anode gas supply piping 51 are, in an descending order from upstream side (hydrogen tank 52 side), the opening/closing valve 53, the regulator 54, the hydrogen supply unit 55, and the pressure measuring unit 56. The opening/closing valve 53 is opened or closed by a command from the controller 20 to control inflow of hydrogen from the hydrogen tank 52 toward the upstream side of the hydrogen supply unit 55. The regulator 54 is a pressure reducing valve for adjusting pressure of hydrogen on the upstream side of the hydrogen supply unit 55, and its opening degree is controlled by the controller 20.

The hydrogen supply unit 55 may be formed of an injector which is an opening/closing valve of an electromagnetic drive type. The pressure measuring unit 56 measures pressure of hydrogen on the downstream side of the hydrogen supply unit 55 and transmitting a measurement result to the controller 20. Based on the measured value of the pressure measuring unit 56, the controller 20 controls the hydrogen supply unit 55 to thereby control the flow rate of hydrogen supplied to the fuel cell 10.

The anode gas circulation system 60 includes anode exhaust gas piping 61, a gas-liquid separator 62, anode gas circulation piping 63, a hydrogen circulation pump 64, anode drain piping 65, a drain valve 66, a pressure measuring unit 67, and a temperature measuring unit 68. The anode gas circulation system 60 performs circulation and discharge of an anode exhaust gas (also referred to as 'anode off gas') containing waste water as well as unreacted gas (hydrogen, nitrogen, etc.) which is discharged from the anode of the fuel cell 10 without being used in the power generation reaction.

The anode exhaust gas piping 61 connects the gas-liquid separator 62 and an outlet of the anode gas discharge manifold (not shown) of the fuel cell 10 to each other. The gas-liquid separator 62 is connected to the anode gas circulation piping 63 and the anode drain piping 65. The gas-liquid separator 62 separates a gaseous component contained in the anode exhaust gas and liquid water from each other, then guiding the gaseous component to the anode gas circulation piping 63 while guiding the liquid water to the anode drain piping 65. The anode exhaust gas piping 61 is also referred to as 'anode gas discharge flow path.'

The anode gas circulation piping 63 is connected to a position of the anode gas supply piping 51 downstream of the hydrogen supply unit 55. The anode gas circulation piping 63 is provided with a hydrogen circulation pump 64. Hydrogen contained in the gaseous component separated in the gas-liquid separator 62 is delivered to the anode gas supply piping 51 by the hydrogen circulation pump 64 so as to be reused as anode gas. The anode gas circulation piping 63 is referred to as 'anode gas circulation flow path.' Further, the hydrogen circulation pump 64 is referred to as 'circulation device.'

The anode drain piping 65 is for discharging liquid water separated in the gas-liquid separator 62 out of the fuel cell system 100. The anode drain piping 65A is provided with a drain valve 66. The controller 20 keeps the drain valve 66 normally closed, and opens the drain valve 66 at a preset specified timing of drain or a discharge timing of inert gas in the anode exhaust gas.

The pressure measuring unit 67 of the anode gas circulation system 60 is provided on the anode exhaust gas piping 61. At a proximity to the anode gas discharge manifold of the fuel cell 10, the pressure measuring unit 67 measures pressure of the anode exhaust gas (back pressure on the anode side of the fuel cell 10) and transmits a measurement result to the controller 20. Based on the measured value of the pressure measuring unit 67 in the anode gas circulation system 60 and the above-described measured value of the pressure measuring unit 56 in the anode gas supply system 50, the controller 20 controls the supply of hydrogen to the fuel cell 10.

Also, the temperature measuring unit 68 of the anode gas circulation system 60 measures an ambient temperature of the anode gas circulation system 60, particularly an ambient temperature (outside air temperature) of the hydrogen circulation pump 64 as a temperature of outside air, and transmits a measurement result to the controller 20. Based on the measured value of the temperature measuring unit 68, the controller 20 controls the rotating speed of the hydrogen circulation pump 64, as will be described later.

The cooling medium circulation system 70 includes upstream-side piping 71a, downstream-side piping 71b, a radiator 72, a cooling medium circulation pump 75, an upstream-side temperature sensor 76a, and a downstream-side temperature sensor 76b. The upstream-side piping 71a and the downstream-side piping 71b are cooling medium piping, respectively, along which the cooling medium for cooling the fuel cell 10 is circulated. The upstream-side piping 71a connects an inlet of the radiator 72 and an outlet of the cooling medium discharge manifold (not shown) of the fuel cell 10 to each other. The downstream-side piping 71b connects an outlet of the radiator 72 and an inlet of the cooling medium supply manifold (not shown) of the fuel cell 10 to each other.

The radiator 72 cools the cooling medium by performing heat exchange between the cooling medium flowing through the cooling medium piping 71 and outside air. The cooling medium circulation pump 75 is provided halfway on the downstream-side piping 71b to feed out the cooling medium cooled in the radiator 72 to the fuel cell 10. The upstream-side temperature sensor 76a is provided on the upstream-side piping 71a, and the downstream-side temperature sensor 76b is provided on the downstream-side piping 71b. The upstream-side temperature sensor 76a and the downstream-side temperature sensor 76b transmit measured cooling medium temperatures, respectively, to the controller 20. Based on the measured values (cooling medium temperatures) of the upstream-side temperature sensor 76a and the downstream-side temperature sensor 76b, the controller 20 controls operation of the radiator 72.

The power charge/discharge system 80 includes a drive motor 82 as a load device, an inverter (INV) 84, a secondary battery 86, and a DC/DC converter 88. The fuel cell 10 is electrically connected to the inverter 84 via direct current lines DCL while the secondary battery 86 is electrically connected to the direct current lines DCL via the DC/DC converter 88.

The secondary battery 86 is charged by output power of the fuel cell 10 and regenerative electric power of the drive motor 82, and functions as an electric power source together with the fuel cell 10. The secondary battery 86 may be implemented by a lithium ion battery as an example.

The DC/DC converter 88 controls current and voltage of the fuel cell 10, controls charging and discharging of the secondary battery 86, and variably adjusts the voltage level of the direct current lines DCL, based on commands from the controller 20. The inverter 84 converts DC power obtained from the fuel cell 10 and the secondary battery 86 to AC power and supplies the power to the drive motor 82. The drive motor 82 operates according to the electric power supplied from the inverter 84 in response to the accelerator position, to thereby drive wheels WL connected thereto via gears or the like. Also, when regenerative electric power is generated by the drive motor 82, the inverter 84 converts the regenerative electric power into DC power and charges the secondary battery 86 therewith via the DC/DC converter 88.

In the fuel cell system 100 described hereinabove, the cathode gas supply system 30 as well as the cathode gas discharge system 40, the anode gas supply system 50 as well as the anode gas circulation system 60, and the power charge/discharge system 80 are controlled by the controller 20 so that electric power serving as power source for the vehicle will be outputted from the fuel cell 10 in response to the accelerator position. An explain will be given hereinbelow as to process for increasing the rotating speed of the hydrogen circulation pump 64 to increase the circulation amount of the anode gas (hydrogen) by the anode gas circulation system 60 during operation of the fuel cell system 100.

Figure 2:
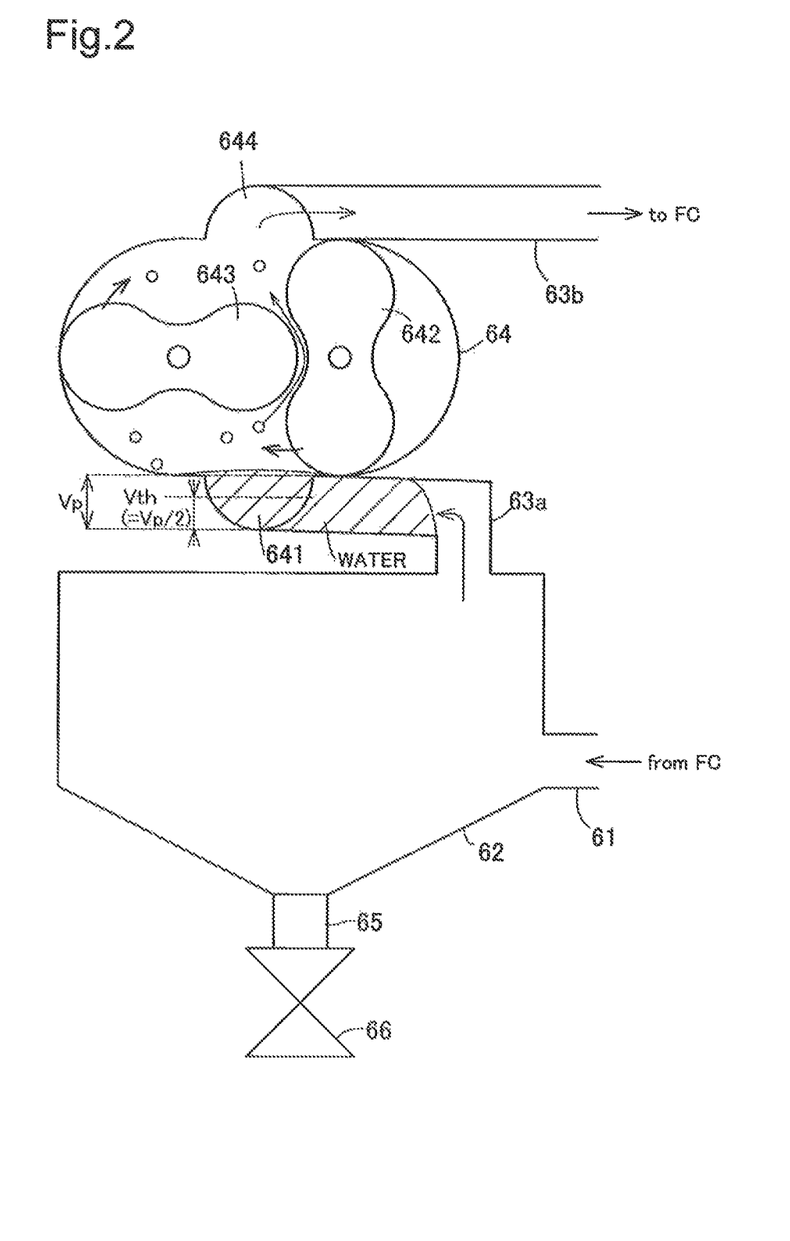
FIG. 2 is an explanatory view showing, under magnification, a hydrogen circulation pump and a gas-liquid separator in an anode gas circulation system.

FIG. 2 is a magnified explanatory view showing the hydrogen circulation pump 64 and the gas-liquid separator 62 in the anode gas circulation system 60. The anode exhaust gas piping 61 connected to the outlet of the anode gas discharge manifold (not shown) in the lower part of the fuel cell 10 is connected to the lower part of the gas-liquid separator 62. A first anode gas circulation piping 63a connected to the vertically upper part of the gas-liquid separator 62 is connected to a suction port 641 of the hydrogen circulation pump 64 located at its vertically lower part. A second anode gas circulation piping 63b connected to a delivery port 644 of the hydrogen circulation pump 64 located at its upper part is connected to the anode gas supply piping 51 (not shown in this figure), and is connected an inlet (not shown) of the anode gas supply manifold of the fuel cell 10 located at its upper part. That is, the hydrogen circulation pump 64 has a structure that hydrogen sucked from the lower-part suction port 641 is discharged from the upper-part delivery port 644.

When this hydrogen circulation pump 64 continues to operate in a low rotation state, it may occur in some cases that liquid water accumulates in a site from the gas-liquid separator 62 to the hydrogen circulation pump 64, i.e., at sites of the first anode gas circulation piping 63a and the suction port 641 of the hydrogen circulation pump 64, so as to flow into the inside the hydrogen circulation pump 64. The resultant residing liquid water (also referred to as 'residing water') is generated mainly as follows. First, if the temperature of the hydrogen circulation pump 64 is lower than that of the fuel cell 10, condensed water is generated by their temperature differences. Then, with a low rotating speed of the hydrogen circulation pump 64, the circulation flow rate of hydrogen flowing through the anode gas circulation piping 63 becomes lower responsive to the rotating speed, such that generated condensed water cannot be lifted and discharged from the delivery port 644. As a result, liquid water goes on residing in the lower part of the hydrogen circulation pump 64, i.e., at sites of the first anode gas circulation piping 63a and the suction port 641 of the hydrogen circulation pump 64. The residue of liquid water is caused not only by the above-described process, but also such processes as: liquid water residing in the lower part of the gas-liquid separator 62 is sucked up by the hydrogen circulation pump 64, liquid water discharged from the fuel cell 10 and separated by the gas-liquid separator 62 is directly sucked up by the hydrogen circulation pump 64 without accumulating in the lower part of the gas-liquid separator 62, and liquid water derived from the delivery port 644 side of the hydrogen circulation pump 64 trickles down.

As the residing water at the suction port 641 of the hydrogen circulation pump 64 becomes larger in amount, there may occur water biting at impellers 642, 643 of the hydrogen circulation pump 64, which may cause changes in operational noise of the hydrogen circulation pump 64 and incur generation of abnormal noise. Accordingly, in the fuel cell system 100 of this embodiment, generation of abnormal noise is suppressed by executing the processes described below.

Figure 3:
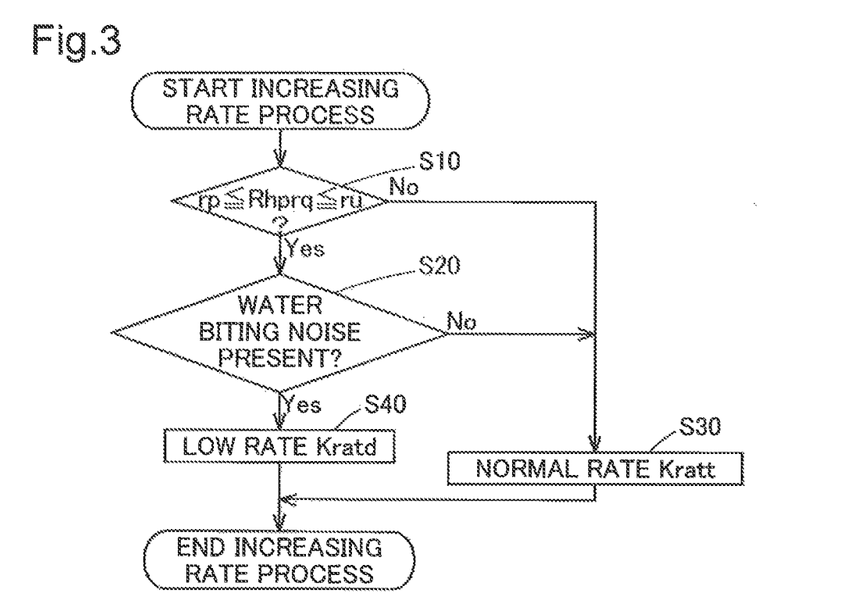
FIG. 3 is a flowchart showing a process of setting an increasing rate for increasing the rotating speed of the hydrogen circulation pump.

FIG. 3 is a flowchart showing a process of setting an increasing rate for increasing the rotating speed of the hydrogen circulation pump 64. This setting of the increasing rate (increasing speed, or rate of increase) is executed before the controller 20 actually increases the rotating speed of the hydrogen circulation pump 64 (hereinafter, also referred to as 'HP rotating speed') in response to a request of an increase of the rotating speed when the request is made to increase the rotating speed of the hydrogen circulation pump 64 so as to increase the flow rate of hydrogen supplied to the fuel cell 10, and further to increase the circulation flow rate of the anode off gas (hydrogen) flowing through the anode gas circulation system 60.

At step S10, it is decided whether a request value for HP rotating speed Rhp (hereinafter, also referred to as 'requested HP rotating speed Rhprq') is within a range from a predetermined first rotating speed rp to a predetermined second rotating speed ru. If the requested HP rotating speed Rhprq is lower than the first rotating speed rp or higher than the second rotating speed ru, then the increasing rate of the rotating speed is set to a predetermined normal rate Kratt at step S30, where an increase of the HP rotating speed Rhp is executed according to the normal rate Kratt. Meanwhile, if the requested HP rotating speed Rhprq is within the range from the first rotating speed rp to the second rotating speed ru, it is judged at step S20 whether a decision of 'water biting noise present' has been affirmed. This judgement is made based on whether a water biting noise flag has been set as a result of a 'water biting noise present' decision in a later-described water biting noise decision process before an event of an increase request of the HP rotating speed Rhp. If the 'water biting noise present' decision has not been affirmed, the increasing rate of rotating speed is set to the normal rate Kratt at step S30, where the HP rotating speed is increased according to the set normal rate Kratt. Meanwhile, if the 'water biting noise present' decision has been affirmed, the increasing rate of rotating speed is set to a predetermined low rate Kratd (<Kratt) at step S40, where the increasing of the HP rotating speed is executed according to the set low rate Kratd. That is, in a case where a 'water biting noise present' decision has been affirmed, the increase of the HP rotating speed is restricted. An effect of the restriction of the increases in the HP rotating speed will be described later.

The first rotating speed rp is a lower limit of the rotating speed (also referred to as 'water-dischargeable rotating speed') corresponding to such a circulation flow rate at which the residing water can be lifted and discharged; the rotating speed rp will be also referred to as 'water-dischargeable rotating speed threshold rp.' The second rotating speed ru is a rotating speed corresponding to a condition that a quick increase in the hydrogen circulation flow rate is preferentially required because of a large amount of generated power (output current) required for the fuel cell 10. The second rotating speed ru is a rotating speed corresponding to a 'specified quantity or more' of the circulation flow rate in a claimed invention.

Figure 4:
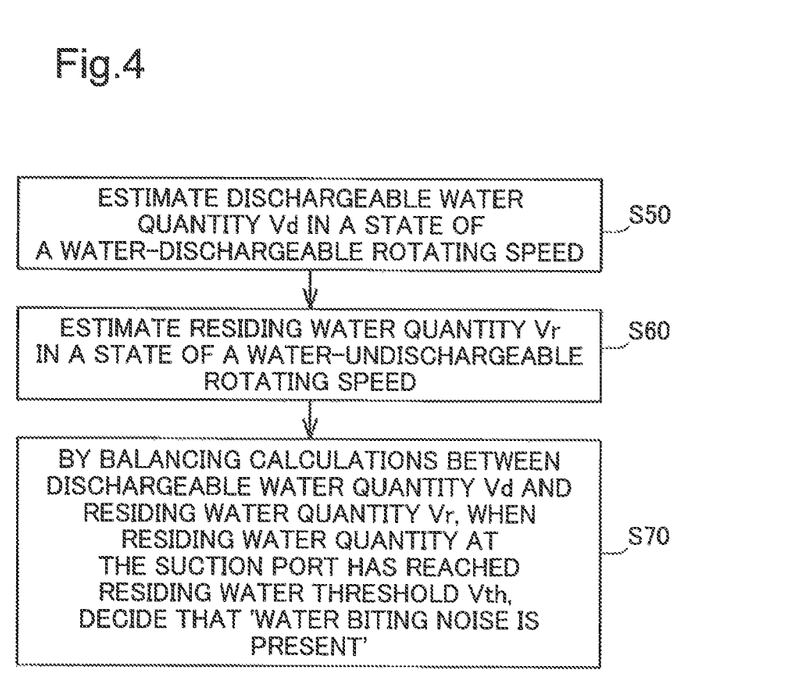
FIG. 4 is an explanatory chart showing a basic technique for decision as to presence or absence of water biting noise.

FIG. 4 is an explanatory chart showing a basic technique for determining presence or absence of water biting noise. The decision as to presence or absence of water biting noise can be made basically by a technique described below.

First, it is estimated a water quantity (hereinafter, also referred to as 'dischargeable water quantity') Vd that is possible to be discharged in a state that the HP rotating speed Rhp of the hydrogen circulation pump 64 is equal to or higher than the water-dischargeable rotating speed threshold rp (step S50). Next, it is estimated a liquid water quantity (hereinafter, also referred to as 'residing water quantity') Vr that goes on residing in a state that the HP rotating speed Rhp is lower than the water-dischargeable rotating speed threshold rp (step S60). At steps S50 and S60, it is assumed that residing water will be discharged when the hydrogen circulation flow rate is equal to or higher than the threshold (a circulation flow rate at the water-dischargeable rotating speed threshold rp), and that residing water will not be discharged when the hydrogen circulation flow rate is lower than the threshold. Then, the dischargeable water quantity Vd is calculated based on a history (time variation) of the circulation flow rate that is equal to or higher than the threshold, and the residing water quantity Vr is calculated based on a history (time variation) of the circulation flow rate that is lower than the threshold. Examples of both the dischargeable water quantity Vd and the residing water quantity Vr will be described later.

Then, balance calculation is performed between the dischargeable water quantity Vd and the residing water quantity Vr, and if the residing water quantity at the suction port 641 of the hydrogen circulation pump 64 is equal to or more than a predetermined residing water threshold Vth, then it is decided that 'water biting noise is present' (step S70). After the decision that 'water biting noise is present', at a next event of increasing the HP rotating speed Rhp from the water-undischargeable rotating speed to a water-dischargeable rotating speed, the setting of the increasing rate is executed responsive to the decision or non-decision of 'water biting noise present' as described with FIG. 3, and the rotating speed increase is executed at the set increasing rate. The residing water threshold Vth is set to an arbitrary value less than a volume or capacity Vp of the suction port 641 of the 0.5 hydrogen circulation pump 64 in consideration of decision margin. In this embodiment, it is assumed that Vth=Vp/2 as shown in FIG. 2. The residing water threshold Vth corresponds to 'a specified value' of the residing liquid water quantity in a claimed invention.

The dischargeable water quantity Vd may be expressed by the following Equation (1), and the residing water quantity Vr may be expressed by the following Equation (2):

$$Vd = kd \cdot td \quad (1)$$

$$Vr = kr \cdot tr \quad (2)$$

where 'kd' is a constant representing a water discharging speed that is estimated from a circulation flow rate corresponding to the HP rotating speed Rhp of the water-dischargeable rotating speed and an ambient temperature Tr of the hydrogen circulation pump 64. The term 'td' is a continuation time (also referred to as 'drain continuation time') of the rotating speed Rhp of the water-dischargeable rotating speed. Also, the term 'kr' is a constant representing an increasing speed of the residing water that is estimated from a circulation flow rate corresponding to the HP rotating speed Rhp of the water-undischargeable rotating speed and an ambient temperature Tr of the hydrogen circulation pump 64. The term 'tr' is a continuation time (also referred to as 'residing continuation time') of the water-undischargeable rotating speed. The ambient temperature Tr of the hydrogen circulation pump 64 is measured by the temperature measuring unit 68 (FIG. 1). A relationship between the water discharging speed kd and the parameters Rhp, Tr is empirically set in advance. This is also the case with the relationship between the rotating speed kr and the parameters Rhp, Tr.

As will be understood from the above equations (1), (2), the drain continuation time td and the dischargeable water quantity Vd are in a proportional relation, and the residing continuation time tr and the residing water quantity Vr are also in a proportional relation. Accordingly, the decision as to water biting noise may be made from the relationship between the water discharge continuation time td and the residing continuation time tr as described below, instead of estimating the dischargeable water quantity Vd and the residing water quantity Vr.

Figure 5:
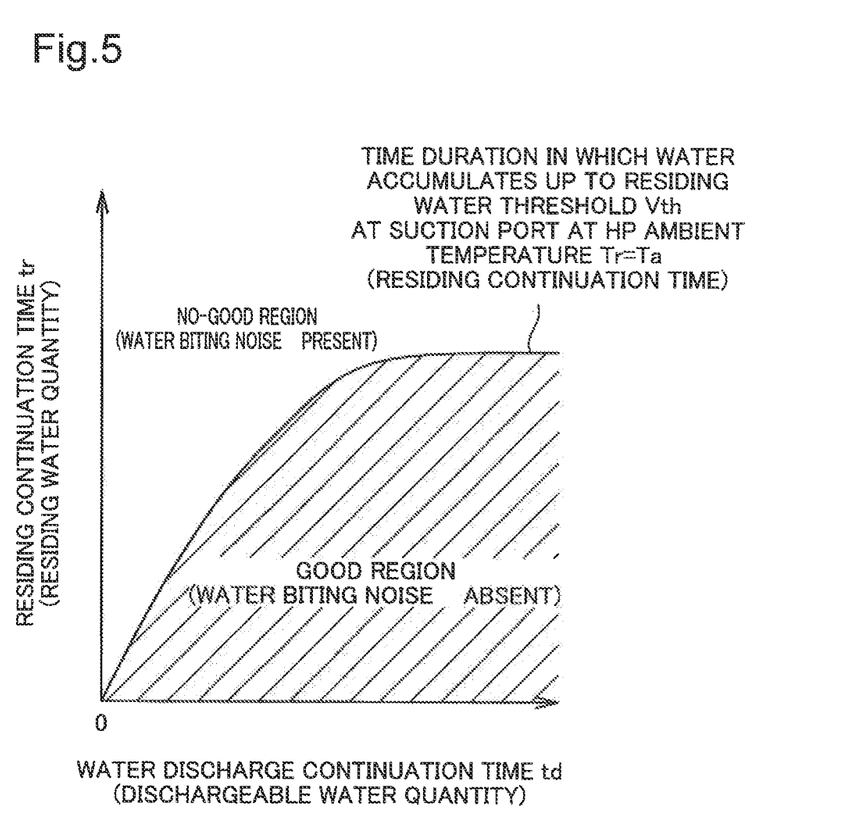
FIG. 5 is an explanatory chart showing the decision as to water biting noise based on a relationship between water discharge continuation time and residing continuation time.

FIG. 5 is an explanatory chart showing the decision as to water biting noise based on a relationship between the water discharge continuation time td and the residing continuation time tr. A curve drawn in solid line in FIG. 5 shows a relationship between the water discharge continuation time td and the residing continuation time tr during which water accumulates up to the residing water threshold Vth at the suction port 641 of the hydrogen circulation pump 64, at an ambient temperature Tr=Ta of the hydrogen circulation pump 64 (also referred to as 'HP ambient temperature'). If the relationship between the water discharge continuation time td and the residing continuation time tr is within a region below the solid line (a hatched region), it is estimated that the residing water at the suction port 641 has not yet reached the residing water threshold Vth. Within this region, a possibility of water biting is low, and it is possible to determine that 'water biting noise is absent.' In contrast to this, with a relationship falling above the solid line, the residing water at the suction port 641 is estimated to be equal to or higher than the residing water threshold Vth, suggesting a large possibility of water biting, whereby it is possible to determine that 'water biting noise is present.'

Thus, if the data of the solid line shown in FIG. 5 are prepared in advance as maps (also referred to as 'decision threshold maps') with respect to individual ambient temperatures Tr of the hydrogen circulation pump 64, it is possible to make a decision as to water biting noise by obtaining a residing continuation time tr corresponding to a relevant water discharge continuation time td as a decision threshold from a decision threshold map corresponding to a relevant ambient temperature Tr of the hydrogen circulation pump 64, and then comparing an actual residing continuation time with the decision threshold.

Figure 6:
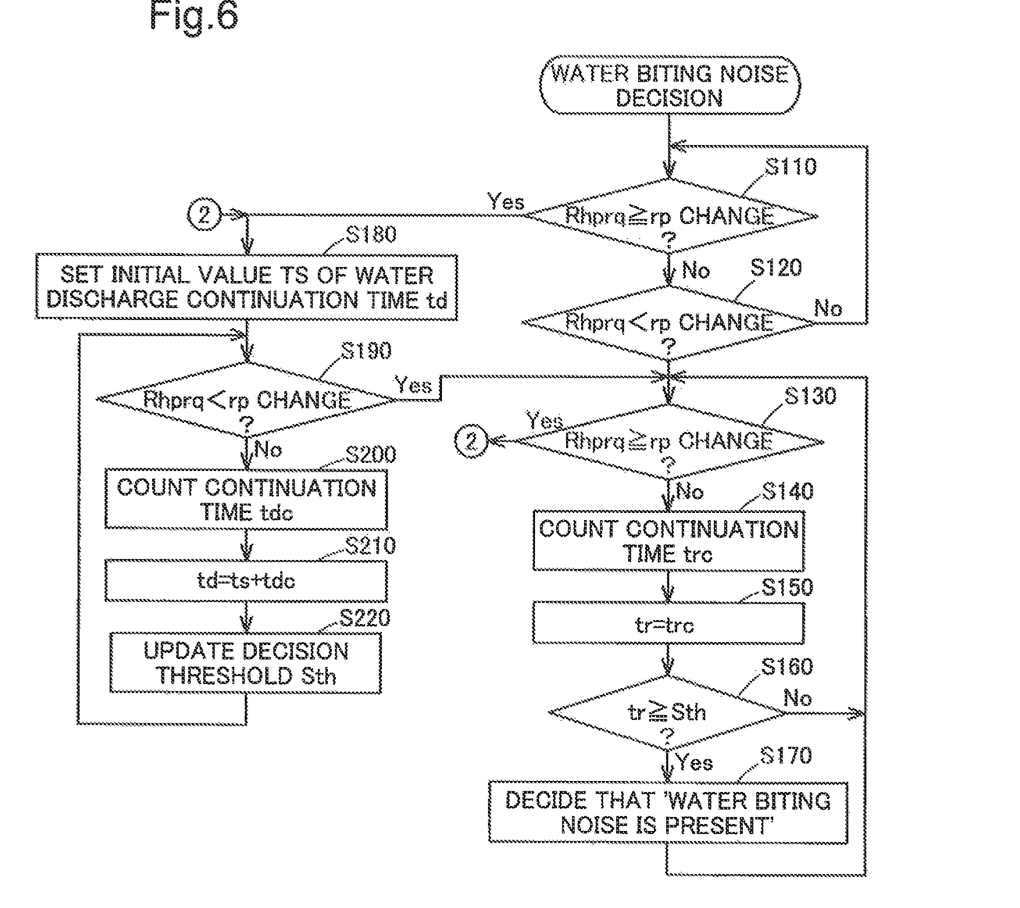
FIG. 6 is a flowchart showing a concrete example of the water biting noise decision.

FIG. 6 is a flowchart showing a concrete example of the water biting noise decision process using the map of FIG. 5. This water biting noise decision process is continually executed by the controller 20 during the operation of the fuel cell system 100. As this water biting noise decision process is started, it is first judged whether there is a change in the requested HP rotating speed Rhprq of the hydrogen circulation pump 64 (steps S110, S120).

If the requested HP rotating speed Rhprq represents a request for a change to a water-undischargeable rotating speed that is less than the water-dischargeable rotating speed threshold rp, then the processing flow moves to step S130, and steps S130 to S170 are repeatedly executed until it is judged at step S130 that the requested HP rotating speed Rhprq is changed to a water-dischargeable rotating speed that is equal to or more than the water-dischargeable rotating speed threshold rp. Contents of this process will be described later.

Meanwhile, if the requested HP rotating speed Rhprq represents a request for a change to a water-dischargeable rotating speed that is equal to or more than the water-dischargeable rotating speed threshold rp, then the processing flow moves to step S180. After execution of step S180, steps S190 to S220 are repeatedly executed until it is judged that the requested HP rotating speed Rhprq is changed to a water-dischargeable rotating speed that is less than the water-dischargeable rotating speed threshold rp. Contents of this process will also be described later.

If it is judged at step S130 that the requested HP rotating speed Rhprq is changed to be a water-dischargeable rotating speed that is not less than the water-dischargeable rotating speed threshold rp, then the processing flow moves to processing of steps S180 to S220. Meanwhile, if it is judged at step S190 that the requested HP rotating speed Rhprq is changed to be a water-undischargeable rotating speed that is less than the water-dischargeable rotating speed threshold rp, then the processing flow moves to processing of steps S130 to S170.

First described below is a processing flow (steps S130 to S170) to be executed in the case where the requested HP rotating speed Rhprq represents a request for a change to a water-undischargeable rotating speed less than the water-dischargeable lower-limit rotating speed rp.

If the requested HP rotating speed Rhprq represents a request for a change to a water-undischargeable rotating speed that is less than the water-dischargeable rotating speed threshold rp (step S120 or step S190), then a continuation time trc of the water-undischargeable rotating speed is counted at step S140, and this continuation time trc is set as a residing continuation time tr at step S150. Then, it is judged at step S160 whether the residing continuation time tr is equal to or more than a decision threshold Sth. At a time point when the residing continuation time tr has come to the decision threshold Sth or more, it is decided at step S170 that 'water biting noise is present,' where a water biting decision flag is set. Then, steps S140 to S170 are repeated until it is judged at step S130 that the requested HP rotating speed Rhprq is changed to a water-dischargeable rotating speed that is equal to or more than the water-dischargeable rotating speed threshold rp.

The decision threshold Sth is a residing continuation time tr which is associated, in the map of FIG. 5, with the water discharge continuation time td at the HP rotating speed Rhp of the water-dischargeable rotating speed that had been executed before the requested HP rotating speed Rhprq has turned to a water-undischargeable rotating speed; the decision threshold Sth is acquired at step S220 as described later. This decision threshold Sth is initially set to a preset arbitrary initial value.

Next described is a processing flow (steps S180 to S220) that is to be executed if the requested HP rotating speed Rhprq represents a request for a change to a water-dischargeable rotating speed that is equal to or more than the water-dischargeable rotating speed threshold rp.

If the requested HP rotating speed Rhprq represents a request for a change to a water-dischargeable rotating speed that is equal to or more than the water-dischargeable rotating speed threshold rp (step S110 or step S130), a count initial value ts for the water discharge continuation time td is set at step S180. The initial value ts is a water discharge continuation time td which is associated with a residing water time margin (Sth−tr) determined from a difference between the residing continuation time tr and the decision threshold Sth at the HP rotating speed Rhp of the water-undischargeable rotating speed that had been executed before the requested HP rotating speed Rhprq has turned to a water-dischargeable rotating speed. The residing water time margin (Sth−tr) is a time duration corresponding to a liquid water quantity (residing water quantity margin) that is permissibly accumulated to reach the residing water threshold Vth in addition to liquid water (residing water) residing during the residing continuation time tr. The initial value ts is set by acquiring a residing continuation time tr associated with the residing water time margin (Sth−tr) by using an initial map corresponding to an ambient temperature Tr of the hydrogen circulation pump 64 measured by the temperature measuring unit 68 out of the preliminarily prepared maps (also referred to as initial maps) for individual ambient temperatures Tr of the hydrogen circulation pump 64.

Figure 7:
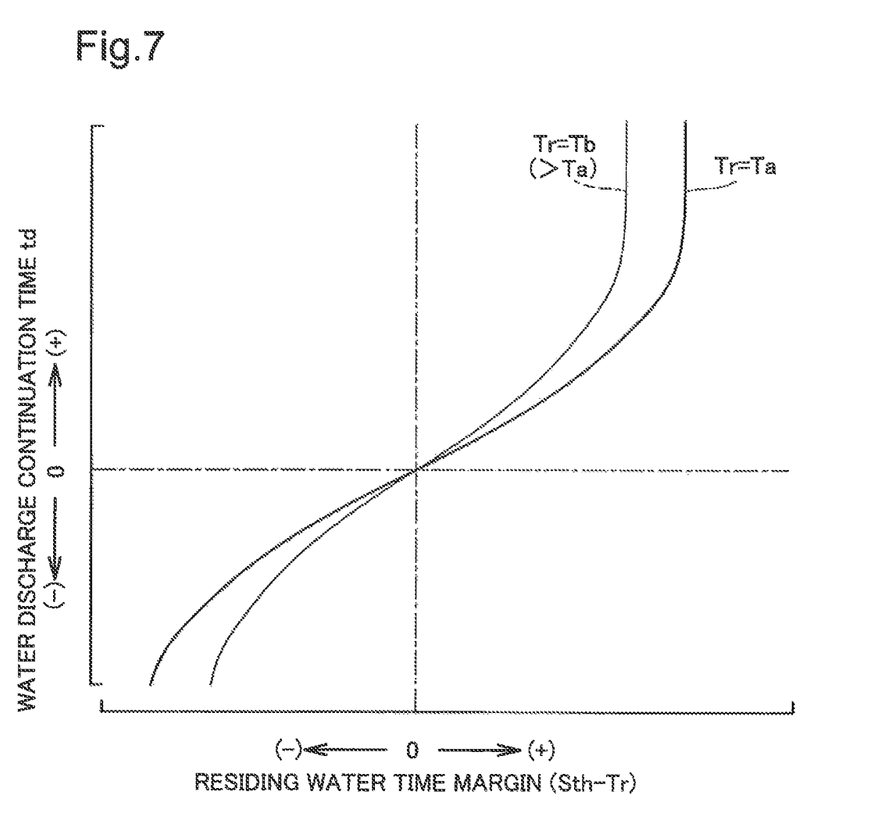
FIG. 7 is an explanatory chart showing an example of an initial value map.

FIG. 7 is an explanatory chart showing an example of the initial value maps. These initial value maps, showing a relationship between the residing water time margin (Sth−tr) and the water discharge continuation time td, are prepared for individual ambient temperatures Tr of the hydrogen circulation pump 64. Shown in FIG. 7 are two values of the ambient temperature Tr, i.e., Tr=Ta and Tr=Tb (>Ta) as examples. In a case of an ambient temperature Tr for which no map is prepared, a prepared map for an upper- or lower-side ambient temperature Tr may appropriately be utilized according to predetermined rules. For example, a lower-side temperature map may be utilized for ambient temperatures not less than the freezing point, and an upper-side temperature map may be utilized for ambient temperatures less than the freezing point.

At step S200 in FIG. 6, it is counted a continuation time tdc of the HP rotating speed that is a water-dischargeable rotating speed. At step S210, a time duration resulting from adding the HP rotating speed continuation time tdc to the initial value ts is set as a water discharge continuation time td. At step S220, the decision threshold Sth corresponding to the water discharge continuation time td is updated. Then, steps S200 to S220 are repeated until it is decided at step S190 that the requested HP rotating speed Rhprq is changed to a water-undischargeable rotating speed that is less than the water-dischargeable rotating speed threshold rp. Accordingly, the decision threshold Sth to be used in step S160 is a value that has been updated immediately before the requested HP rotating speed Rhprq is changed to a water-undischargeable rotating speed.

The decision threshold Sth is a residing continuation time tr associated with the water discharge continuation time td in the above-described map of FIG. 5. This decision threshold Sth is updated by acquiring a residing continuation time tr associated with the water discharge continuation time td while using a decision threshold map corresponding to the ambient temperature Tr of the hydrogen circulation pump 64 measured by the temperature measuring unit 68 out of the preliminarily prepared decision threshold maps for individual ambient temperatures Tr of the hydrogen circulation pump 64.

Figure 8:
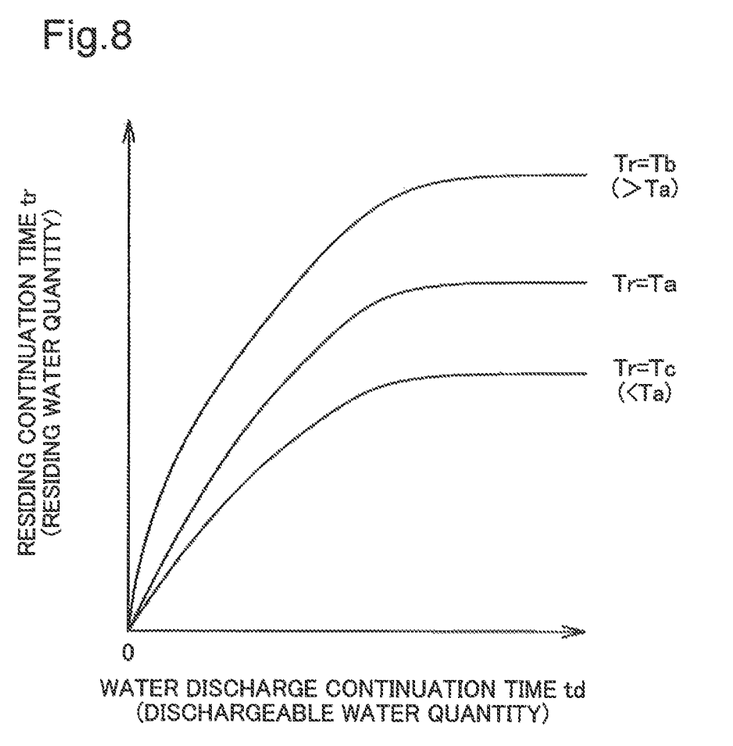
FIG. 8 is an explanatory chart showing an example of a decision threshold map.

FIG. 8 is an explanatory chart showing an example of the decision threshold maps. These decision threshold maps, showing a relationship between the water discharge continuation time td and the residing continuation time tr, are prepared for individual ambient temperatures Tr of the hydrogen circulation pump 64. Shown in FIG. 8 are three values of the ambient temperature Tr, i.e., Tr=Ta, Tr=Tb (>Ta), and Tr=Tc (<Ta) as examples. In a case of an ambient temperature Tr for which no map is prepared, a prepared map for an upper- or lower-side ambient temperature Tr may appropriately be utilized according to predetermined rules. For example, a lower-side temperature map may be utilized for ambient temperatures not less than the freezing point, and an upper-side temperature map may be utilized for ambient temperatures less than the freezing point.

The initial value maps of FIG. 7 and the decision threshold maps of FIG. 8 may be determined in advance by performing actual measurements. Besides, the initial value maps of FIG. 7 may also be derived from the decision threshold maps of FIG. 8.

Figure 9:
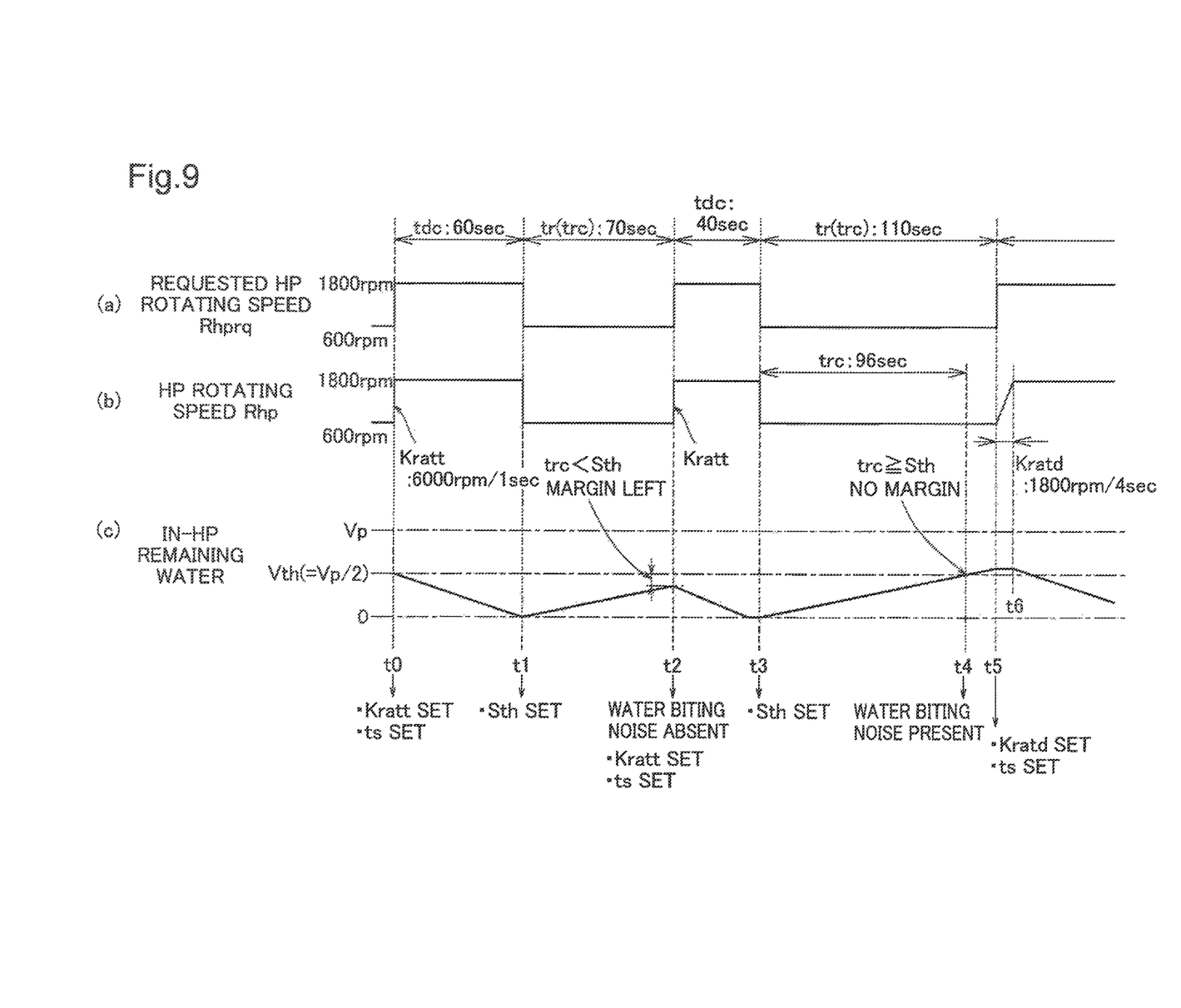
FIG. 9 is a time chart showing a concrete example of the water biting decision and the increasing rate setting.

FIG. 9 is a time chart showing a concrete example of the water biting decision and the increasing rate setting. FIG. 9(a) shows the requested HP rotating speed Rhprq for the hydrogen circulation pump 64, FIG. 9(b) shows the HP rotating speed Rhp of the hydrogen circulation pump 64, and FIG. 9(c) shows remaining water (also referred to as 'in-HP remaining water') in the suction port 641 of the hydrogen circulation pump 64 that varies in response to the HP rotating speed Rhp. FIG. 9(a) shows a case where the requested HP rotating speed Rhprq alternately takes the water-dischargeable rotating speed threshold rp (1800 rpm in this example) as a water-dischargeable rotating speed and 600 rpm as a water-undischargeable rotating speed, from the start timing at time t0. Also, FIG. 9(c) shows an example where liquid water amounting to a residing water threshold Vth (½ of full water capacity) is accumulated as the in-HP remaining water at the start timing of time t0.

As shown in FIG. 9(a), when the requested HP rotating speed Rhprq is changed from 600 rpm (water-undischargeable rotating speed) to 1800 rpm (water-dischargeable rotating speed) at time t0, an increasing rate is set (see FIG. 3) and an initial value ts for the water discharge continuation time td corresponding to a margin quantity of the in-HP remaining water is set (see step S180 in FIG. 6). Then, as shown in FIG. 9(b), the HP rotating speed Rhp is increased at the set increasing rate. In this case, it is assumed that as an initial state, the water biting noise decision is not made, and a water biting flag is not set so that the increasing rate has been set to the normal rate Kratt (6000 rpm/1 sec in this example). Also, since the in-HP remaining water at time t0 is equal to the residing water threshold Vth as described above, it is assumed that the residing water time margin (Sth−tr) is 0 and the initial value ts is set to 0.

Then, as shown in FIG. 9(b), during the continuation time tdc of 60 sec from time t0 to time t1, the HP rotating speed Rhp is maintained at the water-dischargeable rotating speed of 1800 rpm, and as shown in FIG. 9(c), the residing water is discharged by a water discharge quantity corresponding to the continuation time tdc (60 sec), thereby reducing the in-HP remaining water. It is shown that the in-HP remaining water decreases from the residing water threshold Vth to 0 during the time duration from time t0 to time t1.

Further, as shown in FIG. 9(a), when the requested HP rotating speed Rhprq is changed from 1800 rpm to 600 rpm at time t1, a residing continuation time tr corresponding to the water discharge continuation time td (=continuation time tdc+initial value ts) is set as a decision threshold Sth (see steps S190 to S220 in FIG. 6). The decreasing rate for decreasing the HP rotating speed is not particularly limited. It may be set a decreasing rate similar to the normal rate Kratt of the increasing rate, e.g., −6000 rpm/1 sec.

Then, as shown in FIG. 9(b), the HP rotating speed Rhp is maintained at a water-undischargeable rotating speed of 600 rpm during a continuation time trc of 70 sec from time t1 to time t2. As to the in-HP remaining water, as shown in FIG. 9(c), the residing water accumulates by a quantity corresponding to the continuation time trc, causing the in-HP remaining water to increase.

During the accumulation of the residing water, a residing continuation time tr corresponding to a residing water quantity (corresponding to the continuation time trc) is compared with a decision threshold Sth corresponding to the residing water threshold Vth. While the residing continuation time tr (=trc) is less than the decision threshold Sth, it is decided that 'water biting noise is absent.' When and after the residing continuation time tr turns to be equal to or more than the decision threshold Sth, it is decided that 'water biting noise is present.' In this example, during the time duration from time t1 to time t2, the in-HP remaining water does not reach the residing water threshold Vth with a margin left, showing the state that is to be decided as 'water biting noise absent.'

Accordingly, as shown in FIG. 9(a), when the requested HP rotating speed Rhprq is changed from a water-undischargeable rotating speed of 600 rpm to a water-dischargeable rotating speed of 1800 rpm at time t2, the increasing rate of the HP rotating speed is set to the normal rate Kratt (see FIG. 3) and the HP rotating speed is increased at the set normal rate Kratt. Also, as in the case of time t0, an initial value to of the water discharge continuation time td is set (see step S180 in FIG. 6). In this case, since the residing continuation time tr is less than the decision threshold Sth, there is a residing water margin (also referred to as 'remaining water margin') corresponding to the residing water time margin (Sth−tr), so that a positive initial value ts corresponding to the residing water time margin (Sth−tr) is set (see FIG. 7).

Then, as shown in FIG. 9(b), during a time duration of 40 sec from time t2 to time t3, as in the case of the time duration from time t0 to time t1, the HP rotating speed Rhp is maintained at a water-dischargeable rotating speed of 1800 rpm. As to the in-HP remaining water, as shown in FIG. 9(c), the residing water is discharged by a discharge quantity corresponding to the continuation time tdc, thereby decreasing the in-HP remaining water. In this case, since there is left a remaining water margin at time t2, the in-HP remaining water decreases earlier to 0 in terms of the margin quantity, showing a state that the in-HP remaining water has decreased to 0 before time t3.

Further, as shown in FIG. 9(a), when the requested HP rotating speed Rhprq is changed from a water-dischargeable rotating speed of 1800 rpm to a water-undischargeable rotating speed of 600 rpm at time t3, a residing continuation time tr corresponding to the water discharge continuation time td (=continuation time tdc+initial value ts) is set as a decision threshold Sth as in the case of time t1 (see steps S190 to S220 in FIG. 6).

Then, as shown in FIG. 9(b), during a time duration of 110 sec from time t3 to time t5, as in the case of the time duration from time t1 to time t2, the HP rotating speed Rhp is maintained at a water-dischargeable rotating speed of 600 rpm. As to the in-HP remaining water, as shown in FIG. 9(c), the residing water accumulates by a quantity corresponding to the continuation time trc, thereby increasing the in-HP remaining water.

During the accumulation of the residing water, a residing continuation time tr (continuation time trc) is compared with the decision threshold Sth, by which a water biting noise decision is made. Shown in this case is a state that when a continuation time of 96 sec from time t3 to time t4 has elapsed, the in-HP remaining water reaches the residing water threshold Vth, and a decision of 'water biting noise present' is made during the time duration from time t4 to time t5.

Next, as shown in FIG. 9(a), when the requested 1-HP rotating speed Rhprq is changed from a water-undischargeable rotating speed of 600 rpm to a water-dischargeable rotating speed of 1800 rpm at time t5, the increasing rate is set to the low rate Kratd because a decision of 'water biting noise present' was made at time t4 (see FIG. 3). The HP rotating speed Rhp increases slowly at the set low rate Kratd as shown in FIG. 9(b), reaching a target of 1800 rpm at time t6. That is, the increase in the HP rotating speed is restricted. Also, as in the case of time t0 and time t2, the initial value ts for the water discharge continuation time td is set (see step S180 in FIG. 6). In this case, since the residing water continuation time tr (=trc) is larger than the decision threshold Sth as shown in FIG. 9(b), the residing water time margin (Sth−tr) becomes a negative value, so that the in-HP remaining water has become more than the residing water threshold Vth. Therefore, a negative initial value ts corresponding to the negative residing water time margin (Sth−tr) is set (see FIG. 7). Then, after the change to the water-dischargeable rotating speed of 1800 rpm, the residing water is discharged by a quantity corresponding to its continuation time, thereby decreasing the in-HP remaining water.

As described above, when the requested HP rotating speed Rhprq is increased from the water-undischargeable rotating speed of 600 rpm to the water-dischargeable rotating speed of 1800 rpm at time t5, if a decision of 'water biting noise present' has been made in advance, the HP rotating speed is increased slowly at an increasing rate limited to the low rate Kratd. This increases the HP rotating speed Rhp while suppressing the water biting in the HP, to thereby start discharge of the residing water. Moreover, since the HP rotating speed is increased slowly with the limited low rate Kratd, generation of abnormal noise will be suppressed even if the water biting occurs.

B. Modifications (1) Modification 1

In the above-described embodiment, a so-called counter flow type fuel cell is adopted as the fuel cell 10. However, the invention is not limited to this, and allows so-called co-flow type fuel cells or so-called cross-flow type fuel cells to be adopted.

(2) Modification 2

The above embodiment has been described with a configuration in which the controller 20 executes software programs corresponding to various types of control with a microcomputer, thereby fulfilling such functions as the overall controller, the cathode gas controller for controlling the cathode gas supply system 30 and the cathode gas discharge system 40, the anode gas controller for controlling the anode gas supply system 50 and the anode gas circulation system 60, and the cooling medium controller for controlling the cooling medium circulation system 70. Alternatively, the controller 20 may also fulfill, by dedicated processing circuitry with a hardware configuration, the functions of various controllers such as the cathode controller, the anode controller, the cooling medium controller, respectively.

(3) Modification 3

In the concrete example of water biting noise decision in the above embodiment, as shown in FIGS. 5 and 6, water biting noise decision is made by estimating whether residing water quantity at the suction port 641 of the hydrogen circulation pump 64 has accumulated up to the residing water threshold Vth (specified level) based on the water discharge continuation time td and the residing continuation time tr corresponding to the dischargeable water quantity Vd and the residing water quantity Vr. Alternatively, the water biting noise decision may also be made by estimating whether the residing water quantity at the suction port 641 of the hydrogen circulation pump 64 has accumulated up to the residing water threshold Vth (specified level) by the dischargeable water quantity Vd and the residing water quantity Vr. That is, the water biting noise decision is not limited to the above embodiment or the modification examples, and concrete means therefor are not limitative if it is enabled to fulfill the basic technique for the water biting noise decision shown in FIG. 4.

In a case where the water biting noise decision is made not by the water discharge continuation time td and the residing continuation time tr but by the dischargeable water quantity Vd and the residing water quantity Vr, the water biting noise decision of FIG. 6 may be carried out with below-described additions and changes applied thereto as an example.

A process of determining a residing water quantity Vr based on Equation (2) is added between step S150 and step S160 of FIG. 6, and step S160 is changed so that a determined residing water quantity Vr is compared with the decision threshold Sth. Also, step S180 is changed to a process of setting an initial value Vs of the dischargeable water quantity Vd. Further, a process of determining a dischargeable water quantity Vdc based on Equation (1) is added between step S200 and step S210, and step S210 is changed to be Vd=Vs+Vdc.

The initial value Vs of step S180 may be set by determining a dischargeable water quantity Vd corresponding to the residing water quantity margin (Sth−Vr) from initial value maps showing relationships between the residing water quantity margin (Sth−Vr) and the dischargeable water quantity Vd, which are prepared in advance for individual ambient temperatures Tr of the hydrogen circulation pump 64. The decision threshold Sth of step S220 is prepared in advance for each ambient temperature Tr of the hydrogen circulation pump 64. The decision threshold Sth may appropriately be updated by determining a residing water quantity Vr corresponding to a dischargeable water quantity Vd from a decision threshold map showing a relationship between the dischargeable water quantity Vd and the residing water quantity Vr to which liquid water (residing water) of the residing water threshold Vth accumulates at the suction port 641 of the hydrogen circulation pump 64.

(4) Modification 4

In the above embodiment, the increasing rate of the rotating speed of the hydrogen circulation pump 64 is set to a low rate. Alternatively, the rotating speed may also be increased stepwise in restricted rotating speeds of a plurality of stages. That is, the increasing rate of the rotating speed of the hydrogen circulation pump 64 may be restricted.

(5) Modification 5

In the above embodiment, it has been described that the initial value map and the decision threshold map are selected based on an ambient temperature Tr of the hydrogen circulation pump 64 measured by the temperature measuring unit 68. Alternatively, with an outside air measured, the measured outside air may be used instead of the ambient temperature Tr of the hydrogen circulation pump 64. Temperatures used for selection of the map have only to be temperatures that can be treated as those of the hydrogen circulation pump 64.

(6) Modification 6

The above embodiment has been described with an example in which it is restricted the increasing rate of its rotating speed of the hydrogen circulation pump 64 used. However, since the rotating speed of the hydrogen circulation pump 64 corresponds to the circulation flow rate of the anode gas circulation system 60, the hydrogen circulation pump 64 is not limitative and may be replaced with any circulation device that can adjust the circulation flow rate of the anode gas circulation system 60. In such a case, the increasing rate of the circulation flow rate of the circulation device may be restricted.

The present invention are not limited to the above-described embodiment and modifications and may be fulfilled in various modified configurations unless those modifications depart from the gist of the invention. For example, technical features in the embodiment and modifications corresponding to technical features in the individual aspects described in the section of Summary may be replaced or combined with one another, as required, in order to solve part or entirety of the above-described problems or to achieve part or entirety of the above-described advantageous effects. Moreover, those technical features may be deleted, as required, unless herein otherwise described as indispensable.

What is claimed is:

1. A fuel cell system comprising:
a fuel cell;
an anode gas supply flow path for supplying an anode gas to the fuel cell;
an anode gas discharge flow path for discharging an anode off gas from the fuel cell;
an anode gas circulation flow path for connecting the anode gas supply flow path and the anode gas discharge flow path to each other;
a circulation device provided on the anode gas circulation flow path and serving for supplying the anode off gas to the anode gas supply flow path; and
a controller for, when liquid water is residing in the circulation device, controlling a circulation flow rate of the circulation device to discharge the liquid water residing in the circulation device, wherein
the controller restricts an increasing rate of the circulation flow rate of the circulation device if it is decided that a quantity of the liquid water residing in the circulation device is equal to or more than a specified value.

2. The fuel cell system in accordance with claim 1, wherein
the controller determines whether the liquid water residing in the circulation device is equal to or more than the specified value by estimating a quantity of the liquid water residing in the circulation device based on a relationship between a water-dischargeable quantity at a water-dischargeable circulation flow rate at which the liquid water is dischargeable from the circulation device and a quantity of the liquid water residing in the circulation device at a water-undischargeable circulation flow rate at which the liquid water is undischargeable from the circulation device.

3. The fuel cell system in accordance with claim 1, wherein
when the controller increases the circulation flow rate to a specified quantity or more to discharge liquid water from the circulation device, the controller undoes the restriction of the increasing rate of the circulation flow rate by the circulation device.

4. The fuel cell system in accordance with claim 1, wherein
the circulation device is a circulation pump, and
the controller restricts the increasing rate of the circulation flow rate by restricting an increasing rate of rotating speed of the circulation pump corresponding to the circulation flow rate.

5. A method of controlling a fuel cell system comprising a fuel cell, an anode gas supply flow path for supplying an anode gas to the fuel cell, an anode gas discharge flow path for discharging an anode off gas from the fuel cell, an anode gas circulation flow path for connecting the anode gas supply flow path and the anode gas discharge flow path to each other, and a circulation device provided on the anode gas circulation flow path and serving for supplying the anode off gas to the anode gas supply flow path, the method comprising:
when liquid water is residing in the circulation device, controlling a circulation flow rate of the circulation device to discharge the liquid water residing in the circulation device; and
restricting an increasing rate of the circulation flow rate of the circulation device if it is decided that a quantity of the liquid water residing in the circulation device is equal to or more than a specified value.

6. The method in accordance with claim 5, wherein
the decision of whether the liquid water residing in the circulation device is equal to or more than the specified value is executed by estimating a quantity of the liquid water residing in the circulation device based on a relationship between a water-dischargeable quantity at a water-dischargeable circulation flow rate at which the liquid water is dischargeable from the circulation device and a quantity of the liquid water residing in the circulation device at a water-undischargeable circulation flow rate at which the liquid water is undischargeable from the circulation device.

7. The method in accordance with claim 5, wherein
when increasing the circulation flow rate to a specified quantity or more to discharge liquid water from the circulation device, the restriction of the increasing rate of the circulation flow rate by the circulation device is undone.

8. The method in accordance with claim 5, wherein
the circulation device is a circulation pump, and
the restricting an increasing rate of the circulation flow rate is executed by restricting an increasing rate of rotating speed of the circulation pump corresponding to the circulation flow rate.

\* \* \* \* \*